2,990,330
STREPTOMYCES GRISEUS STRAIN 528 NRRL 2607 ANTIBIOTIC AND FERMENTATION PROCESS

Mohan Lal Gattani, 625 7th St., S., Lethbridge, Alberta, Canada
No Drawing. Filed June 6, 1957, Ser. No. 664,185
9 Claims. (Cl. 167—65)

This invention relates to novel compounds possessing antibiotic activity and to a process for the preparation thereof. More particularly, the invention relates to a novel compound referred to herein by the name, uredolysin, to a process for its production by fermentation procedures, to a method for its recovery and concentration from a crude solution, to its purification, and to its derivatives and their production.

It is an object of the present invention to provide a new and useful antibiotic which is active against fungi especially plant pathogens. Another object of the invention is to provide derivatives of this antibiotic useful therefor. A further object is to provide a process for the production and recovery of this antibiotic. Other objects and features of the invention will be apparent to those skilled in the art to which this invention pertains.

It has been found that by cultivating, under controlled conditions, and on suitable nutrient culture media, a hitherto undescribed microorganism, *Streptomyces griseus* strain 528, isolated from a sample of soil taken in Lethbridge, Alberta, Canada, a novel antibiotic, uredolysin is obtained. A culture of the living microorganism has been deposited with the Fermentation Division of the Northern Regional Research Laboratory at Peoria, Illinois, and has been added to its permanent collection as NRRL 2607.

In recent years a number of antifungal agents produced by Streptomyces species have been studied. The development of many of them has been aimed at medical rather than phytopathological problems. As the plant pathogenic fungi generally have lower temperature requirements than human pathogenic fungi it is a special object of this invention to provide an antibiotic especially suited for controlling plant diseases. The invention, however, is not thus limited, it being understood that it embraces all other purposes for which the new antibiotic material is useful.

The following procedure was used to obtain *Streptomyces griseus* strain 528. Tubes containing twenty grams of sterile soil were infected with one milliliter of a *Phoma betae* (Oudem.) Frank spore suspension. A loop of soil rich in organic matter was then added to each tube. After seven days incubation, dilutions of the soil from the tubes were made on nutrient agar for isolation of Streptomyces strains. The strains so obtained were streaked on one side of a petri plate and after four days at 24 degrees centigrade *Phoma betae* was streaked on the remainder of the plate. *Streptomyces griseus* strain 528 produced a 35 millimeter inhibition zone.

*Streptomyces griseus* strain 528 is distinctly different from any previously described species of Streptomyces. It produces a musty odor typical of Actinomycetes. Aerial hyphae are almost straight and unbranched. The spores are spherical from 1.0 to 1.15 microns in diameter. On Emerson's agar slants, the organism grows best at 37 degrees centigrade and maximum production of aerial mycelium occurs at 23 degrees to 37 degrees centigrade. A description of growth characteristic on a number of other media and biochemical characters of the organism are given in Table I.

TABLE I

Culture characteristics of Streptomyces griseus strain 528

| Medium | Growth Characteristic | Remarks |
| --- | --- | --- |
| Gelatin slab | Very poor growth | No liquefaction. |
| Nutrient broth | White in clumps on surface. | No pigment; gelatinous precipitate formed at bottom. |
| Nutrient agar | White thin sparse growth without tinge of color and without aerial mycelium. | No diffusible pigment; No distinct color on underside of mycelium; Characteristic musty odor. |
| Glucose agar | Growth white with aerial mycelium. | Light yellow in reverse; yellow colored tinge at bottom. |
| Potato dextrose agar | Abundant white growth with aerial mycelium. | Light yellow in reverse. |
| Potato plug | Good yellow growth with no aerial mycelium. | |
| Trypticase agar | Mycelium well developed but no aerial spore-bearing hyphae formed. | See Note 1. |
| Bacto Endo agar | Mycelium well developed but aerial spore-bearing hyphae absent. | No sclerotic granules produced. |
| Litmus milk | Brown surface ring | No peptonization; coagulation alkaline reaction. |
| Sabouraud maltose agar. | Abundant white aerial mycelium with spores formed. | No production of sclerotic granules. |
| Tryptone glucose agar. | White with aerial mycelium. | Light yellow in reverse; No production of sclerotic granules. |
| Nutritive casienate agar. | Mycelium well developed but no spore-bearing hyphae are formed. | No sclerotic granules produced. |
| Starch hydrolysis | | Very good hydrolysis. |
| Nitrate reduction | | Nitrate not reduced to nitrite. |

NOTE 1.—After eighteen hours' incubation at 37 degrees centigrade sclerotic granules develop abundantly. The size of the sclerotic granules range from twelve to 75 microns in diameter. In their formation a hypha gets thickened up and a brownish green mass of tissue is produced. This eventually gets black. In the early stages a hyaline sheath can be distinguished around the sclerotic granules but eventually that ruptures and it appears as if the sclerotic mass has a sheath of radiating black hyphae. When warmed with lacto-phenol the black stain of the sclerotic granules comes out and masses of hyphal tissue which take a deeper stain than the mycelium are left behind. Some of these sclerotic granules coalesce in pairs or sometimes in threes and produce a big sclerotic granule ranging in diameter up to 75 microns. Sometimes a small granule can be seen coalescing with two sclerotic granules which have coalesced together. Usually on treatment with warm lacto-phenol their separate indentity can be established thus indicating that there is not real fusion of these masses.

*Streptomyces griseus* strain 528 produces uredolysin when it is cultured under suitable conditions and in a suitable synthetic nutrient medium and preferably, a nutrient medium containing both an assimilable carbohydrate and an organic nitrogen compound. When spores of *Streptomyces griseus* strain 528 are added to freshly collected soil and the inoculated soil incubated at 28 degrees centigrade for six days, no evidence of uredolysin is found in the aqueous extract. Suitable media for production of uredolysin contain a source of carbohydrate for example, glucose and/or a mixture of glucose and starch, sucrose, maltose, lacetose, glycerol, and the like and a nitrogen source, for example, distiller's solubles (dried effluent of screened stillage obtained from yeast fermentation), cottonseed meal, soybean meal, beef extract, milk proteins, corn steep liquor and the like. Nutrient inorganic salts can be advantageously incorporated in the medium for example, salts capable of yielding ions such as sodium potassium, calcium, phosphate, sulfate, and the like. Inorganic nitrogen sources such as nitrate salts or ammonium salts can also be employed.

Essential trace elements such as magnesium, manganese, zinc, iron, cobalt, and the like, can also be included in the culture medium for growing *Streptomyces griseus* strain 528. Such trace elements are commonly supplied as impurities incidental to the addition of the other constituents of the medium.

Submerged, aerobic tank culture conditions are the conditions of choice for the production of uredolysin. For the preparation of limited amounts of the antibiotic, shake flasks and surface cultures in bottles can be employed. When growth is carried out in tanks, it is preferable to use the vegetative form of the microorganism for inoculation to avoid a pronounced lag in the production of the antibiotic and the attendant inefficient utilization of the equipment. Accordingly, it is desirable first to produce a vegetative inoculum of the microorganism by inoculating a relatively small amount of culture medium with a spore form of the microorganism and when a young, active, vegetative inoculum has been secured, to transfer the vegetative inoculum aseptically to tanks. The medium in which the vegetative inoculum is produced can be the same as, or different from, that utilized for the production of the antibiotic.

The culture medium advantageously is maintained at a temperature between about 24 and about 32 degrees centigrade, and preferably at about 28 to 30 degrees centigrade; the pH advantageously is between pH 6 and pH 8.

The process of the invention is not to be limited to the production of uredolysin by *Streptomyces griseus* strain 528 or by organisms fully answering the above description which has been given for illustrative purposes only. It is to be understood that the fermentative processes of this invention also embrace other uredolysin-producing strains of *Streptomyces griseus* strain 528, such strains being readily produced and isolated by routinely applied isolation and strain modification methods which include selection of cultured organisms and exposure of these organisms to modifying means such as X-ray, ultraviolet light, chemical agents such as nitrogen mustards, and the like.

The rate of production of antibiotic and the concentration of the antibiotic in a culture medium are readily followed during the growth period of the microorganism by testing samples of the culture medium for antibiotic activity against an organism known to be susceptible to the antibiotic, e.g., *Candida albicans, Fusarium culmorum, Helminthosporium sativum,* and *Penicillium oxalicum.* For such determinations, it is convenient to employ a test which comprises making serial dilutions of the culture samples, adding portions of the diluted samples to melted nutrient agar, solidifying the agar in a petri dish, inoculating the plate with a young culture of the assay organism, and determining the greatest dilution of the culture medium which causes complete inhibition of the growth of the microorganism on the nutrient agar.

The production of antibiotic is also followed by turbidimetric test procedures commonly employed in connection with the production of other antibiotics. In general, maximum production of the antibiotic after inoculation of the culture medium occurs between about two and about six days when submerged aerobic cultures are employed.

The antibiotic material can be recovered from the culture medium by extractive or adsorptive techniques including adsorption of the antibiotic on ion-exchange resins such as Permutit DR (a porous anionic polymer with weak anionic exchange properties for strong acids; see U.S. Patent 2,702,263, column 2, lines 62 to 73) and the like, and eluting the antibiotic material by suitable eluting agents such as aqueous lower-alkanols. The extraction procedures are preferred for commercial production inasmuch as they are less time consuming and expensive.

A suitable recovery procedure comprises acidifying the fermented nutrient medium, advantageously after the removal of the mycelium, and then removing and drying the resulting precipitate. Alternatively, the precipitate can be dissolved in an aqueous alkaline medium and then freeze-dried to obtain the antibiotic activity in the form of a salt.

The antibiotic can be extracted from the mycelium with the polar solvents noted below and the extracts can be worked up in the same way.

A preferred extractive process for recovering the antibiotic activity from the fermented nutrient medium (with or without the mycelium removed) comprises adding a water-immiscible polar organic solvent, i.e., a lower-alkanol or lower-alkyl acetate, lower-alkyl ketone, and the like, to said medium, advantageously at an acid pH (pH two to pH six for example), concentrating the solvent extract to a relatively small volume and precipitating the antibiotic material from the solvent by the addition of a miscible solvent in which the antibiotic is slightly soluble.

A more specific and preferred embodiment of the method for isolating uredolysin involves filtering the whole beer at a pH between about seven and about ten and preferably at about eight, adjusting the filtrate to a pH between about two and about seven and preferably at about six, with a mineral acid such as sulfuric acid, hydrochloric acid, phosphoric acid, and the like, and extracting the antibiotic material with a suitable solvent such as a lower-alkyl acetate and preferably, amyl acetate, ethyl acetate, and the like. Suitable solvents also include water-immiscible lower-alkanols such as n-butanol, n-amyl alcohol, iso-amyl alcohol, and the like, and water-immiscible ketones such as methyl isobutyl ketone, methyl iso-propyl ketone, and the like. The extract is concentrated by vacuum distillation or other suitable means and to the concentrate thus obtained is added a hydrocarbon solvent having between four and eight carbon atoms, and preferably a six or seven carbon hydrocarbon solvent such as hexane (e.g., technical hexane sold as Skellysolve B) or heptane. The active material is precipitated and dried to obtain a partially purified product. The product may be further purified by crystallization from a water-acetone solution at an acid pH.

Instead of precipitating the antibiotic activity directly from the solvent extract, it can be further refined by successive solvent transfers. A suitable process is to extract the organic solvent extract with aqueous alkali at a pH favorable to the transfer of the antibiotic to the aqueous phase. A pH of about pH 9 to pH 11, advantageously pH 10, is suitable. This is effective to leave the non-alkaline soluble materials in the organic solvent extract. Now by adjusting the pH to a pH favorable to transfer to the organic phase, e.g., about pH 2 to about pH 8.5 (advantageously about pH 7.5 to about pH 8.5), the antibiotic can be extracted by the ethyl acetate or other organic solvents and recovered therefrom by precipitation as above described. Alternatively the aqueous extract can be acidified to cause precipitation of the antibiotic. Addition of acetone along with the acidification is sometimes advantageous. A pH ranging from about pH 2 to about pH 6.5 is suitable.

Uredolysin is associated as a complex with an antifungal polyene of the candidin, ascosin, trichomycin group. This antifungal polyene is not essential to the uredospore devitalizing activity of uredolysin; neither is it antagonistic. Thus the polyene can be removed if desired but it is not necessary to do so. In fact the complex has greater breadth of spectrum and is especially more effective against the smuts, *Ustilago hordei, Ustilago tritici,* and *Ustilago kolleri.* When desired the two components can be separated by fractional crystallization, Craig countercurrent distribution, adsorption chromatography, or partition chromatography. The latter also can be used effectively to effect purification of the crude uredolysin. For this purpose a 1:1:2 (volume basis) methanol-benzene-water system can be used.

Uredolysin is strongly acidic since it is soluble in one third molar sodium bicarbonate solution; it lacks significant U.V. absorption (in ethanol) and is more stable than the polyenes; it has a characteristic infra red spectrum in ethanol and in mineral oil mull; it is insoluble in water, acid solutions, and non-polar solvents; it is soluble in polar organic solvents and in alkaline solutions; it has an Rf value of 0.8 in 50:50 acetone-water and an Rf value of 0.95 in ethanol:ammonia (95:5) whereas the polyene component does not move in these solvent systems.

Metal salts including alkali metal and alkaline earth metal salts, zinc and aluminum salts of uredolysin are obtained by treating an aqueous solution or suspension of the antibiotic with an aqueous solution of the appropriate base and drying, either by evaporating the solution to dryness in vacuo or by freeze-drying, the corresponding sodium, potassium, calcium, zinc, aluminum, and like salts are obtained.

To prepare amine or ammonium salts of uredolysin, a solution of the antibiotic in an organic solvent such as methanol, ethanol, propanol, butanol, and the like, ethyl acetate, amyl acetate, and the like, is treated with the desired amine such as mono-, di-, and trimethylamines, mono-, di-, and triethylamines, mono-, di-, and tripropylamines (iso- and normal), ethyldimethylamine, benzyldiethylamine, cyclohexylamine, benzylamine, dibenzylamine, N,N'-dibenzylethylenediamine, bis-(ortho-methoxyphenylisopropyl) amine, and like lower-aliphatic, lower-cycloaliphatic, and lower-araliphatic amines up to and including eight carbon atoms; heterocyclic amines such as piperidine, morpholine, pyrrolidine, piperazine, and the lower-alkyl derivatives thereof such as 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine, and the like; amines containing water solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris-(hydroxymethyl) - aminomethane, phenylmonoethanolamine, p-tertiaryamylphenyldiethanolamine, and galactamine, N-methylglucamine, N-methylglucosamine, ephedrine, phenylephedrine, epinepherine, procaine, and the like; tetraethylammonium hydroxide, and like quaternary ammonium hydroxides; guanidine, and the like.

In a similar manner, other salts of uredolysin are prepared by reacting the antibiotic with more complex amines such as the neomycins (including neamine, neomycin B and neomycin C), the erythromycins (including erythromycin and erythromycin B), the tetracyclines, streptomycin and the like.

Uredolysin is active against a wide variety of fungi and has little if any activity against bacteria. The crude antibiotic complex was tested against a number of fungi. For this purpose two methods were used. In the first, the inhibition of the spore germination of fungi by the antibiotic was studied using the agar plate spore-germination method for testing fungicides. By this test information was obtained on the spore inhibition of plant pathogenic fungi by the antibiotic. Table II summarizes the data on the LD 95 values of the spore inhibition spectrum obtained on two percent water agar medium.

TABLE II

*Spore inhibition spectrum of crude antibiotic*

|  | LD 95 value in μgm./per ml. after 24 hrs. | LD 95 value in μgm./per ml. after 96 hrs. |
|---|---|---|
| Erysiphe graminis | >2 but <4 | >4 but <10. |
| Puccinia graminis tritici | >4 but <10 | >4 but <10. |
| Ustilago hordei | >10 but <20 | >10 but <20. |
| Tilletia foetida | no germination | >2 but <4. |
| Ustilago tritici | >10 but <20 | >10 but <20. |
| Ustilago Kolleri | >10 but <20 | >10 but <20. |

In the second method the crude antibiotic was tested against a number of microorganisms by a dilution technique. The antibiotic was added to agar and the test organisms were streaked on the surface of agar. The minimum inhibitory concentration in μgm./ml. is recorded for a number of organisms in Table III. The highest concentration of antibiotic used in these experiments was forty μgm./ml. and lowest was two μgm./ml.

TABLE III

*Minimum inhibitory concentration in μmg./ml. of the crude antibiotic against various microorganisms[1]*

| Test organism | 24 hours | 96 hours |
|---|---|---|
| Penicillium oxalicum | >4 but <10 | >40. |
| Hormodendrom cladosporioides | no growth | >2 but <4. |
| Helminthosporium sativum | <2 | >2 but <4. |
| Fusarium culmorum | >4 but <10 | >40. |
| Phoma betae | no growth | >4 but <10. |
| Botrytis cineria | do | >10 but <20. |
| Verticillium alboatrum | do | >4 but <10. |
| Stagnospora meliloti | do | <2. |
| Trichoderma glaucum | do | >10 but <20. |
| Candida albicans | >2 but <4 | >10 but <20. |

[1] *Candida albicans* was tested in glucose one percent, peptone 0.5 percent, yeast extract 0.1 percent, agar two percent, pH 6.8. Other organisms were tested in glucose three percent, yeast extract 0.7 percent, agar two percent.

It will be seen from Tablee II and III that the crude antibiotic complex was quite active against a wide variety of fungi. The minimum inhibition point varied with the fungus. Similar tests with *Micrococcus pyogenes, Proteus vulgaris, Bacillus subtilis, Serratia marcesans* and *Escherchia coli* showed no inhibitory action at 100 μgm./ml. level, which was the highest concentration used.

The fungicidal activity of crude antibiotic was further demonstrated by adding solutions of antibiotic to heavy suspension of *Candida albicans* or of spores of *Penicillium oxalicum*. The mixtures were placed on a reciprocal shaker at 25 degrees centigrade. Samples were taken after 2, 7, and 24 hour intervals and streaked on Emerson's agar plates which were then incubated 24 hours (*Candida albicans* at 37 degrees centigrade and *Penicillium oxalicum* at 26 degrees centigrade) to determine the viability of the cells or spores. Death of *Candida albicans* cells occurred at forty μgm./ml. level after 24 hours or in seven hours at 100 μgm./ml. concentration of the antibiotic. With *Penicillium oxalicum* only 24 hours exposure at forty μgm./ml. or 100 μgm./ml. was effective. The results are tabulated in Table IV.

TABLE IV

*Growth of* Candida albicans *and* Penicillium oxalicum *after exposure to crude antibiotic*

| Concentration of crude antibiotic in μgm./ml. | Growth on Emerson's agar plates | | | | | |
|---|---|---|---|---|---|---|
|  | C. albicans | | | P. oxalicum | | |
|  | 2 hrs. | 7 hrs. | 24 hrs. | 2 hrs. | 7 hrs. | 24 hrs. |
| 5% ethanol control | ++ | ++ | ++ | ++ | ++ | ++ |
| 10 | ++ | + | + | ++ | + | + |
| 40 | + | − | − | + | + | − |
| 100 | + | − | − | + | + | − |

The tests of Tables II and IV were repeated using crude uredolysin, i.e., material from which the polyene has been removed by means of a cellulose column, in place of the crude uredolysin complex. The results are shown in the following tables:

TABLE IIA

*Spore inhibition spectrum of crude uredolysin*

|  | LD 95 value in μgm. per ml. after 24 hrs. | LD 95 value in μgm. per ml. after 96 hrs. |
|---|---|---|
| Puccinia graminis tritici | <1 | <1. |
| Ustilago hordei | >40 but <100 | >100. |
| Ustilago tritici | >40 but <100 | >100. |
| Ustilago kolleri | >20 but <40 | >40 but <100. |

Comparison of Tables II and IIA shows that the activity against uredospores is due to uredolysin and that the activity against the smuts (Ustilago) is due largely to the polyene.

TABLE IVA

Growth of Candida albicans and Penicillium oxalicum after exposure to crude uredolysin

| Concentration of crude uredolysin in μgm./ml. | Growth on Emerson's agar plates | | | | | |
|---|---|---|---|---|---|---|
| | C. albicans | | | P. oxalicum | | |
| | 2 hrs. | 7 hrs. | 24 hrs. | 2 hrs. | 7 hrs. | 24 hrs. |
| 5% ethanol control | ++ | ++ | ++ | ++ | ++ | ++ |
| 10 | + | + | + | + | + | + |
| 40 | + | + | + | + | + | + |
| 100 | − | − | − | + | + | + |

Comparison of Tables IV and IVA shows that the activity against Candida albicans is due to uredolysin and that the activity against Penicillium oxalicum is due largely to the polyene. Assays against these two organisms are therefore useful in distinguishing uredolysin and the polyene.

Uredolysin is very active against the uredospores of cereal rusts. When tested by the agar plate spore germination method for testing fungicides crude uredolysin complex was found to completely inhibit the germination of the uredospores of Puccinia graminis tritici (Race 15B and 56) at 3 p.p.m. At 2 p.p.m. about eight percent spores produced germ tube initials from three to five microns long which lysed within 24 hours. Spores with lysed germ tubes when transferred to water agar media failed to produce normal germ tubes thus indicating that lysis results in the death of spores. At 0.5 p.p.m. lysis occurred when the germ tubes had grown up to forty microns long. Twenty percent of the germ tubes which did not lyse at 0.5 p.p.m. remained short (100 microns) as compared to long (750 microns) gem tubes in the controls. Crude uredolysin complex also inhibited the germination and caused lysis in the germ tubes of the uredospores of Puccinia coronata avenae, Puccinia sacalina, Puccinia triticina, and Melampsora lini at 0.5 p.p.m.

In Puccinia graminis tritici (Race 15B from Rescue) at 5 p.p.m. the rust spores do not show any germination even after four days' incubation at twenty degrees centigrade. The action of the antibiotic appears to be strictly fungicidal as at this concentration the spores lose their viability after 24 hour exposure.

At 2 p.p.m. about eight percent spores produce germ tube initials from three to five microns long. These are produced within two hours of transfer of spores on the plates and more than ninety percent of the germ tubes undergo lysis. Spores with lysed germ tubes when transferred to water agar media fail to produce normal germ tubes or to grow thus indicating that lysis results in the death of spores.

At 1 p.p.m. lysis occurs when the germ tubes have attained a length of ten to fifteen microns. About eight percent of the spores show germ tubes without lysis that attain a length of 100 microns after 24 hours. These germ tubes, however, do not grow any longer up to 96 hours.

At 0.5 p.p.m. the germ tubes undergo lysis when they are thirty to forty microns in length with about twenty percent of the germ tubes showing normal growth. These germ tubes are small from 200 to 300 microns as compared to germ tubes of 750 to 1000 microns in the controls. Essentially similar results were obtained with Puccinia graminis tritici (Race 56 from Little Club).

With Puccinia coronata avenae there was no germination at five and two p.p.m. At one p.p.m. about twenty percent of the spores showed germ tube initials of about two microns some of which lysed. At 0.5 p.p.m. 42 percent of the spores germinated with fifteen to 25 microns long germ tubes after 24 hours. In controls eighty percent of the spores germinated with 300 to 750 microns long germ tubes.

In Puccinia secalina there was no germination at five, two and one p.p.m. At 0.5 p.p.m. about ten percent of the spores showed the formation of germ tube initials some of which lysed. In controls ninety percent of the spores germinated and the germ tubes were 150 to 450 microns long.

In Melampsora lini there was no germination at five, two, and one p.p.m. At 0.5 p.p.m. three percent of the spores showed germ tube initials of three to five microns. In controls the germination was 41 percent and the germ tubes were about 225 microns long.

In Puccinia triticina there was no germination at five p.p.m. At two p.p.m. about fifteen percent of the spores showed three to five microns long germ tubes some of which lysed. At one p.p.m. twenty percent of the spores germinated with forty microns long germ tubes and at 0.5 p.p.m. the germination was twenty percent with ninety microns long germ tubes. In controls the germination was about 41 percent and the germ tubes were about 450 microns long.

In greenhouse studies effective control of stem rust of wheat, crown rust of oats, and leaf rust of rye was obtained by spraying the plants at 140 p.p.m. of crude uredolysin. Vide infra.

Uredolysin is non-phytotoxic to wheat, barley, rye and oats. The crude antibiotic complex had no adverse effect on the germination of wheat seeds (Rescue) on treatment for 2½ minutes at concentrations of 200 μgm./ml. concentration or less. At 2000 μgm./ml. about fifteen percent reduction in germination occurred. In another experiment fifty seeds were treated with 2000 μgm./ml. and 200 μgm./ml. of the antibiotic in three replications and plated on trypticase soy agar plates seeded with Fusarium culmorum. The size of the lytic zone around the seeds even after seven days' incubation was fifteen millimeters and ten millimeters respectively. When the same experiment was repeated on trypticase soy agar plates seeded with P. oxalicum the average size of the lytic zone was twenty-one and fifteen millimeters respectively. It would thus appear the seed treatment with the crude antibiotic gave good protection against Fusarium culmorum and Penicillium oxalicum for a week. No phytotoxic effects were noticed when wheat or barley plants were sprayed with 200 μgm./ml. concentrations of the antibiotic.

The effectiveness of uredolysin for the control of rusts was shown by the following experiments: Seven-day old wheat seedlings, variety Little Club, were sprayed with an aqueous solution of uredolysin at 140–150 parts per million, each seedling receiving about 0.2 milliliter of spray solution, and then inoculated with Puccinia graminis tritici (Race 15B) and incubated for twenty-four hours. Parts herein are by weight unless otherwise specified.) After eight days in the greenhouse 100 percent (all) of 43 control seedlings were heavily infected whereas only 4.3 percent (2) of 46 treated seedlings were infected. In a like experiment with oats, variety Victory, using Puccinia coronata avenae and an incubation period of 48 hours, 92.8 percent (39) of 42 plants were infected whereas only 2.3 percent (1) of 43 treated plants were infected. In a like experiment with rye, variety Petkus, using Puccinia secalina and a 48 hour incubation period, 97 percent (43) of 45 control plants were infected whereas only 2.2 percent (1) of 45 treated plants were infected. Essentially similar results were obtained using post-inoculation instead of pre-inoculation sprays.

These experiments show that under conditions producing a heavy infection of rust, essentially complete control of the disease is obtained. These data show also, considering the low content of uredolysin in the crude, that uredolysin is unusually effective for the control of cereal rusts. This coupled with the lytic action of the crude uredolysin (in more refined preparations inhibitory and lethal action against rust uredospores is sometimes obtained at extremely low concentrations without any lytic activity), and action not shared by other antibiotics active against rust unredospores, shows that uredolysin is a new and unique material and makes possible a new and unique and highly effective control for cereal rusts.

The following examples are illustrative of the process and products of this invention and are not to be construed as limiting.

EXAMPLE 1

*Production of antibiotic*

Fermentation was carried out in one liter Erlenmeyer flasks containing 400 milliliters of glucose broth medium having the following composition:

| | Percent |
|---|---|
| Glucose | 10 |
| Peptone | 5 |
| Beef extract | 5 |
| Sodium chloride | 5 |

Flasks were inoculated from three day old cultures on potato dextrose agar of *Streptomyces griseus* strain 528. The incubation flasks were agitated continuously for 96 hours at thirty degrees centigrade on a rotary shaker. During the incubation period the medium became more alkaline reaching pH 7.5 after 96 hours.

The antibiotic potency of the culture broth was determined by the agar plate cup method with *Penicillium oxalicum* (Thom.) and *Candida albicans* (Robin) Berkhout as assay organisms. Four-day old cultures of *Penicillium oxalicum* on V–8 medium [Phytopathology 45: 559–563 (1955)] and 24-hour old cultures of *Candida albicans* on nutrient agar were suspended in sterile distilled water containing traces of Aerosol OT [di(2-ethylhexyl) sodium sulfosuccinate]. The suspension was adjusted to fifty percent light transmission and one milliliter was added to 25 milliliters of cooled trypticase soy agar (Baltimore Biological Laboratory, Baltimore Md., U.S.A.). Test plates were prepared by pouring twenty milliliters of unseeded trypticase soy agar into sterile petri plates, permitting it to harden; and then adding five milliliters of seeded soy agar and rotating to give a uniform layer of seeded agar.

The culture broth was assayed in clay cups placed on the plates. The culture broth produced zones of inhibition twenty millimeters in diameter.

EXAMPLE 2

*Precipitation and extraction of the precipitate*

Upon completion of the 96 hour fermentation period, the mycelium was separted from the broth by centrifugation. Although both fractions contained antibiotic activity, they were processed separately.

Seven liters of the broth was acidified to pH 2.3 by the slow addition of 1.5 normal hydrochloric acid with constant stirring. A murky brown precipitate separated out and was separated by centrifugation. The precipitate was washed once with water. Assay of the supernatant showed that most of the antibiotic activity had been precipitated. The washed precipitate was extracted three times in a Waring Blendor with fifty milliliter aliquots of ethanol and the extract were combined. (Unless otherwise specified, the term "ethanol" refers to 95 percent aqueous ethanol).

A portion of the above extract was evaporated to dryness and incorporated in potato-dextrose agar to give a concentration of 25 parts per million based on the dried ethanol extract of the acid precipitated complex. Agar plates were then made from this agar and inoculated with selected test organisms. The results after incubation under conditions favorable to the individual organisms are shown in the following table:

TABLE V

*Inhibition of growth by ethanol-extracted acid-precipitated complex*

| Fungus | Size of colonies in millimeters | |
|---|---|---|
| | Control | Acid-pptd. Complex |
| *Leptosphaeria herpotrichoides* | 38.5 | 10.5 |
| *Alternaria solani* | 60.5 | 19.5 |
| *Botrytis cinerea* | 92 | 42 |
| *Aschochytes imperfecta* | 32.5 | 11 |
| *Sclerotinia sclerotiorum* | 92 | zero |
| *Collectotrichum graminicolum* | 27 | 9 |
| *Verticillium alboatrum* | 21.5 | 12 |
| *Kabatiella cauliuria* | 29 | 9.5 |
| Pythium sp | 92 | 62 |

EXAMPLE 3

*Solvent transfer*

The mycelium was extracted three times in a Waring Blendor with fifty milliliter aliquots of ethanol and the extracts were combined. This extract and the remainder from Example 2 were bulked and taken to dryness in vacuo at 35 degrees centigrade in a rotary evaporator. A brownish residue was obtained. The dry brownish residue was redissolved in 30 milliliters of one third molar sodium bicarbonate aqueous solution. The bicarbonate solution was then extracted four times with 20 milliliter aliquots of n-butanol. These extracts were bulked and taken to dryness in vacuo at 44 degrees centigrade in a rotary evaporator. A dry yellow-green residue which was freely soluable in ethanol was obtained. Ethanolic solutions of this material were used for the biological studies given above where crude antibiotic or crude uredolysin complex is referred to. This material also was observed to have plant growth activity. When sprayed on wheat, variety Rescue, at 100 parts per million a marked growth-promoting effect was obtained. The treated seedlings were about three times the height of the untreated ones.

EXAMPLE 4

*Chromatographic separation of uredolysin*

The yellow-green residue of Example 3 was put on a cellulose column and eluted with absolute alcohol. The eluate was recovered in five milliliter fractions. The first three fractions contained most of the uredolysin and are free of the U.V. absorption characteristic of the polyene antibiotics. The first three fractions were combined and allowed to stand overnight at minus 40 degrees centigrade. An inactive precipitate formed and was filtered off. The filtrate was used in the biological studies with rusts and other organisms and is the material referred to in the tests given above for crude uredolysin.

The balance of the filtrate was evaporated in a stream of nitrogen to dryness and taken up in a minimum of ethanol. The ethanol solution thus obtained was transferred to a sodium chloride plate and examined for infrared absorption. It showed the following characteristic adsorption expressed in inverse centimeters:

(1) A broad strong adsorption was observed at 3160 indicating NH and/or OH.

(2) A strong adsorption at 1702 with shoulders at 1732 and 1650 was observed indicating carbonyl.

(3) A strong broad band at 1225 apparently due to C—O was noted.

(4) Another strong adsorption possibly due to C—O was observed at 1040.

(5) Adsorption at 2900, 1530, 1460, and 1375 was obtained. The first, third and fourth of these are indicative of linear carbon-hydrogen. The second is of unknown origin.

(6) A weak to medium adsorption attributable to an aliphatic chain of at least four carbon atoms was noted but was eliminated on further purification. The band at 1225 also resolved into two maxima at 1250 and 1150 on further purification.

The crude uredolysin complex thus produced can be further purified and separated into its components by the methods outlined above.

For the control of wheat rust and other plant fungal disease uredolysin, per se or in uredolysin complex, can be applied by dissolving it in an alkaline aqueous solution, or by dissolving a preformed salt in water, and spraying the resulting solution on the plant. Concentrations of 100 to 200 parts per million of the crude complex are typical. Small concentrations in proportion as the uredolysin is more concentrated or refined can be used. To the solution can be added spreaders or stickers and other adjuvants commonly used in horticultural fungal sprays.

Uredolysin, per se or in uredolysin complex, can also be used in combination with other antibiotics such as fumagillin, actidione, endomycin, filipin, olegomycin, helixin and like antibiotics having fungicidal activity. It can also be combined with antibiotics such as streptomycin, neomycin, the tetracycline, and the like to give products having both antifungal and antibacterial activity.

Uredolysin, per se or in uredolysin complex, in an insoluble form, for example, the acid form or an insoluble salt such as the calcium and zinc salts, can be incorporated in a dusting powder such as talc, pyrophyllite, bentonite, diatomite, Georgia clay, Attapulgus clay, walnut shell flour, wood flour, and the like to form dusting compositions. A suitable method for preparing such compositions is to mix a solution of uredolysin (insoluble form) in an organic solvent, such as ethanol, with a small amount of the dusting powder (enough to give about a 0.5 percent dust) evaporate the solvent and mill to provide a concentrate which can be blended with the rest of the dusting powder to provide a product with the desired concentration of uredolysin.

By incorporating into the above concentrate a wetting and dispersing agent of the kind and in the manner well known in the art for making water-dispersible powders, a composition suitable for application from aqueous spray suspensions is provided. Such compositions, especially if a sticker or adhesive is incorporated in the tank mix, can be used advantageously when it is desired to minimize run-off.

The finely divided solid carrier materials used in dusts and water-dispersible powders should have an average particle size of less than 200 microns, advantageously in the order of fifty microns or less. Solid carrier having a particle size such that ninety percent of the particles pass a 320 mesh screen are commonly used. Micropulverized solid carriers having an average particle size of ten microns or less are sometimes used.

The uredolysin, per se or in uredolysin complex, can be combined with summer oils, especially those formulated with nonionic emulsifiers. Inasmuch as summer oils and summer oil concentrates are either oil-in-water or water-in-oil emulsions the uredolysin in a soluble form can be incorporated in the aqueous phase. In the concentration used, the uredolysin does not adversely affect the stability of the emulsion or emulsion concentrate, especially if a nonionic emulsifier is used. Amine salts of uredolysin and long chain fatty acid amines such as stearyl amine can be used, sometimes with advantage, because of the enhanced oil solubility of such salts.

While the invention has been illustrated with reference to fungal diseases of plants it will be understood that it is not so limited but embraces broadly the control of fungal organism which infest plant and animal matter in the natural and fabricated and living and non-living states and also such other uses as are inherent in the chemistry of the novel antibiotic of the invention. It is to be understood also that the invention is not to be limited to the exact details of operation or exact compounds shown and described herein, as obvious modifications and equivalents will be apparent to one skilled in the art, and the invention is therefore to be limited only by the scope of the appended claims.

I claim:

1. A process for producing uredolysin which comprises propagating a culture of *Streptomyces griseus* strain 528 NRRL 2607 in a nutrient medium under submerged aerobic conditions at a temperature between about 24° C. and about 37° C. for a period of from two to six days, and recovering the so produced uredolysin from the resulting fermentation liquor.

2. A process for producing uredolysin, which comprises propagating a culture of *Streptomyces griseus* strain 528 in an aqueous nutrient-containing, carbohydrate solution having a pH from 6 to 8, under submerged aerobic conditions, at a temperature between about 24° C. and about 37° C. for from two to six days and recovering the uredolysin from the resulting fermentation liquor.

3. A process which comprises the steps of aerobically fermenting an aqueous nutrient liquor at a temperature within the range from about 24° C. to about 37° C. at a pH between 6 and 8 with the organism *Streptomyces griseus* strain 528, whereby uredolysin is produced.

4. A process for the production of uredolysin which comprises growing under aerobic conditions a culture of *Streptomyces griseus* strain 528 in an aqueous medium having a pH between 6 and 8 and containing a soluble carbohydrate and a source of assimilable nitrogen at temperatures within the range from about 24° C. and about 37° C. for a period of time of about two to six days, whereby the aqueous medium is fermented and uredolysin is produced, and recovering the uredolysin from the fermented liquor.

5. The non-polyene fungicidal product, uredolysin, prepared by the process of claim 1 being characterized as an acidic material soluble in one third molar sodium bicarbonate solution, by lack of significant ultraviolet absorption, and by a positive phenol test.

6. A composition of matter selected from the group consisting of the acid and salt forms of uredolysin, said acid form being characterized as in claim 5.

7. An uredospore devitalizing composition, the essential active component of which is selected from the group consisting of the acid and salt forms of uredolysin, the acid form being characterized as in claim 5, and said active component being dispersed in a dispersible vehicle.

8. The composition of claim 7 in which the dispersible vehicle is a finely divided inert solid.

9. A process for the control of cereal rust infections which comprises treating the plants with an uredospore devitalizing composition the essential active component of which is selected from the group consisting of the acid and salt forms of uredolysin, the acid form being characterized as in claim 5.

References Cited in the file of this patent

UNITED STATES PATENTS

| | | |
|---|---|---|
| 2,649,401 | Haines et al. | Aug. 18, 1953 |

OTHER REFERENCES

Sneath: J. Gen. Microbiol., August 1957, pp. 184–200.

Waksman et al.: Actinomycetes and Their Antibiotics, Williams and Wilkins, Baltimore, 1953, pp. 23, 24, 87.

Ainsworth et al.: J. Gen. Microbiol., 10, 465–474, June 1954.

Bergey's Manual of Determinative Bacteriology, 6th ed., 1948, Williams and Wilkins Co., pp. 47–48.

Amman et al.: Applied Microbiology, 3: 3, pp. 181–186, May 1955.